Nov. 20, 1956 — C. H. WEBB ET AL — 2,771,291
ELASTIC CORD SHOCK ABSORBER
Filed April 10, 1951 — 2 Sheets-Sheet 1
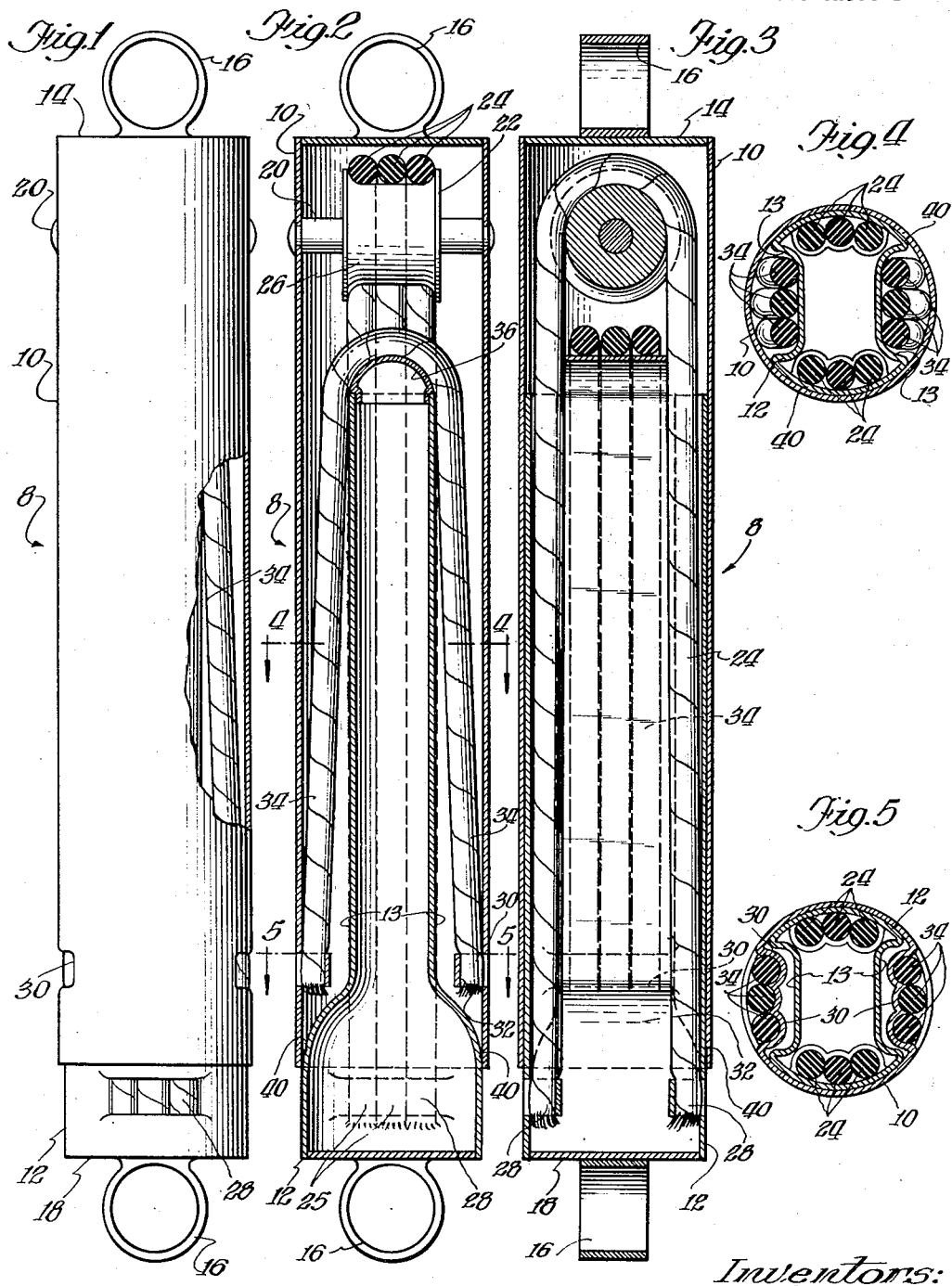
Inventors:
Chester H. Webb
Theodore B. Holliday
By: Louis Bernat
Attorney.

Nov. 20, 1956  C. H. WEBB ET AL  2,771,291
ELASTIC CORD SHOCK ABSORBER
Filed April 10, 1951  2 Sheets-Sheet 2
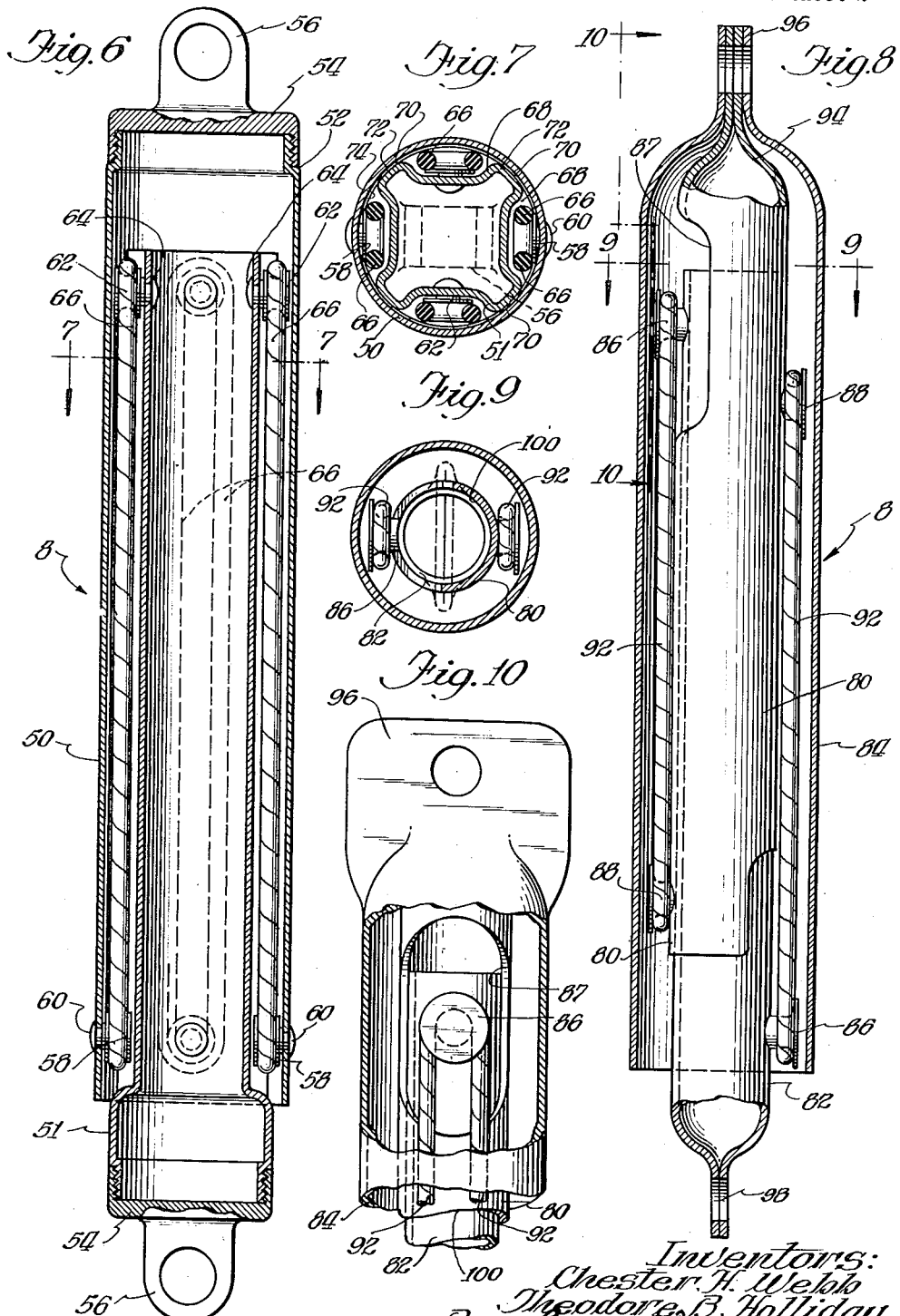
Inventors:
Chester H. Webb
Theodore B. Holliday
By: Louis Bernat
Attorney

United States Patent Office 2,771,291
Patented Nov. 20, 1956

2,771,291
ELASTIC CORD SHOCK ABSORBER

Chester H. Webb, Dayton, Ohio, and Theodore B. Holliday, Elmhurst, Ill.

Application April 10, 1951, Serial No. 220,232

7 Claims. (Cl. 267—63)

This invention relates to shock absorber type devices in general and their use in shock and vibration absorbing systems, and concerns itself primarily with shock absorber devices of the elastic, compression-extension type.

An object of this invention is to provide an improved shock absorber which may be used in connection with the landing gear of aircraft in order to soften the impact often occurring during landing, and to prevent bounce and stall on hard landings. This results in savings in aircraft equipment.

It is also an object of this invention to provide an improved economical shock absorber which may be used in the automotive applications in order to substantially reduce road shock and vibration.

A further object of our invention is to provide a shock absorber device in which elastic members are so arranged and interconnected with the one portion of the shock absorber and another reciprocable portion so that the extension and compression forces of the elastic members interact so as to produce a substantially steady state within the shock absorber device.

Another object of our invention is to provide a simple, light-weight shock absorber which is substantially unaffected by temperature and altitude pressure variations, and is operative under adverse climatic and terrain conditions.

These and other objects of our invention will become apparent as the description proceeds.

Carrying out our invention in a preferred embodiment thereof, we provide an outer body having a coaxial, telescopic or parallel member disposed therein, which is capable of linear movement with respect to the outer body or housing. The outer body or housing and the inner member are interconnected with elastic members or cords wherein at least one set of elastic members interconnects fixed supports arranged adjacent to opposite ends of the housing and internal member. Another set of elastic members interconnects fixed points arranged at intermediate points of said housing and the inner member. These elastic members are so arranged as to produce at least two forces which counteract each other so that in a static condition the housing body and the inner member are in a position wherefrom they may move in either direction.

This motion, which may be of a predetermined amount, depends upon the extendability and the elastic recovery of the elastic members. The elastic recovery is the ability of a material to regain its original length after being stretched. The time of recovery whether delayed or immediate is also an important factor. The physical properties of the material may be identified as stretchability or modulus of stretch. The modulus of stretch may be defined as the ratio of the increase in load to the increase in elongation. It is possible to define the stress-strain relationship and the speed of recovery specifically to each elastic material used.

A more comprehensive understanding of our invention will be afforded from the following detailed description and the accompanying drawings in which:

Figure 1 is a plan view partly in section of a shock absorber device embodying our invention;

Figure 2 is a cross-sectional view of the device as shown in Figure 1;

Figure 3 is a cross-sectional view of the device as shown in Figure 2 which has been rotated 90°;

Figure 4 is a cross-sectional view taken along line 4—4 of Figure 2;

Figure 5 is a cross-sectional view taken along line 5—5 of Figure 2;

Figure 6 is a cross-sectional view showing a modified form of our invention;

Figure 7 is a cross-sectional view taken along line 7—7 of Figure 6;

Figure 8 is a cross-sectional view showing another modified form of our invention employing an outer casing;

Figure 9 is a cross-sectional view taken along the line 9—9 of Figure 8; and

Figure 10 is an enlarged side view of the device partly broken away and taken along the line 10—10 of Figure 8.

In a preferred embodiment of our invention illustrating a shock absorber or strut 8, as shown in Figure 1, the outer body member or housing cylinder 10 has an inner member or body 12 telescopically or coaxially inserted partially therein. The outer cylinder 10 has at its closed end 14 an adaptor ring mounting 16 which may be attached thereto by welding, brazing and the like. The cylinder 10 may be defined as, although not limited to, a cylindrical tubing having end plate 14 attached thereto or may be formed as a single piece drawn cup having the outer mounting 16 attached thereto. The inner member 12 has at its lower end 18 thereof a corresponding mounting 16 attached thereto in a similar manner.

Figure 2 illustrates a cross-sectional view of the shock absorber device generally designated by numeral 8, showing the relative position of the outer cylinder 10 with respect to the inner member 12. In the construction of the shock absorber 8 a mounting pin 20 is affixed to the outer cylinder 10 and has centrally located thereon a bearing 22. A plurality of elastic cord members 24 are extended over the outer surface 26 of said bearing 22. These elastic members 24 terminate at the lower portion of the inner member 12 and may be defined as inner fixed mountings 28. By rotating the shock absorber 90° as shown in Figure 3, the fixed mountings 28 are more clearly shown as being approximately 180° apart. These fixed mountings 28 are embossed protrusions formed from the body of the inner member 12, and end portions 25 of the elastic cord members 24 are inserted therein whereupon the protrusions are crimped so as to tightly secure said cord members 24. The means for securing said cord members 24 at the lower extremity shall not be restricted to crimping; they may be affixed by any other clamping means.

Outer fixed mountings 30 are embossed protrusions formed in the outer cylinder 10 wherein the end portions 32 of another set of elastic cords or members 34 are affixed thereto. The other set of elastic cord members 34 are extended and looped over a formed support 36, which may be integrally formed with the inner member 12. The outer cylinder 10 is telescopically supported with respect to the inner member 12 so that a coaxial or telescopic arrangement is achieved thereby and a portion of the bearing surface therebetween is defined by numeral 40.

Figure 4 is a cross-sectional view of the shock absorber 8 showing the relative positions of the elastic members 24 and 34 respectively; and in addition, illustrates a particular construction of the coaxial or telescopic arrangement of the outer cylinder 10 with respect to the inner member 12. The inner member 12 is of formed or stamped metallic construction having concave depressions or grooves 13 formed therein so as to allow the elastic cord members 34 to be contained therein. The bearing surfaces 40 define the slidable engagement of the coaxial or telescopic arrangement of the inner member 12 with respect to the outer cylinder 10.

Figure 5 is a cross-sectional view as shown in Figure 2 which illustrates the relative position of the elastic cord members 24 with respect to the inner member 12 and the outer cylinder 10 below the support 36; and in addition, the clamping construction performed by crimping the mountings 30 in order to affix the elastic members 34.

In a modified embodiment of our invention illustrated in Figure 6, the mode of operation of the device is similar to that as described in Figures 1, 2 and 3, although the means and the construction for mounting the elastic cord members are different.

The outer cylinder 50 as shown in Figure 6 is a formed tube having a threaded portion on its upper end 52. A screw cap 54 having a mounting lug 56 attached thereto is threaded on said outer cylinder 50. Mountings 58 may be rotatably affixed to the outer cylinder 50 by drive pins 60. Correspondingly a formed inner member 51, having a corresponding threaded screw cap 54 and mounting lug 56 attached thereto is coaxially or telescopically arranged within the outer cylinder 50. Mountings 62 are similarly attached to the lower portion of the inner member 51 by drive pins 64.

A plurality of endless belt type elastic cord members 66 are looped over the respective mountings 58 and 62. Similarly, a plurality of counteracting elastic cord members may be used as illustrated in Figure 6, as shown by dotted line, and in Figure 7.

Figure 7 is a cross-sectional view of Figure 6 showing the relative positions of the looped cord members 66 with respect to the inner member 51 and the outer cylinder 50. These cord members are positioned within concave depressions 68 which have been formed in the inner member 51. Bearing surfaces 70 are formed by the extended protrusion 72 of the inner member 51 and the internal side wall 74 of the outer cylinder 50. This arrangement affords a telescopic or coaxial linear movement with respect to the two bodies, primarily the outer cylinder 50 and the inner member 51. The fixed mountings 58 are securely affixed to the outer cylinder 50; and the fixed mountings 62 are securely affixed within the depressions 68 to the inner member 51.

Another embodiment of this invention is shown in Figure 8. This modification illustrates a simple construction wherein the coaxial or telescopic arrangement of the movable bodies, primarily the outer cylinder 80 and the inner member 82, are of cylindrical construction affording greater bearing alignment. This construction may utilize an outer casing 84 in order to enclose the complete device. A plurality of fixed mountings 86 are positioned at opposite ends of the internal member 82.

An opening 87 in the inner member allows the fixed mounting 86 to extend through outer cylinder 80 and in alignment with the lower fixed mounting 88 of the outer cylinder 80 in order that the elastic member 92 may be in complete alignment. Correspondingly, fixed mountings 88 are positioned at opposite ends of the outer cylinder 80. Endless elastic cord members 92 are looped and interconnect the corresponding fixed mountings 86 and 88 of the inner member 82 and the outer cylinder 80, respectively.

The upper end 94 of the outer cylinder 80 is formed to become integral with the casing 84 thereby forming a mounting lug 96. Correspondingly the lower end of the inner member 82 is formed and pierced to form a similar mounting lug 98.

Figure 9 is a cross-sectional view of Figure 8 showing the relative position of the elastic cord members 92 with respect to the outer cylinder 80 and the inner member 82. It shall be noted that the bearing surface 100 extends substantially over the entire length of the contacting surfaces of the inner member 82 and the outer cylinder 80.

Figure 10 is an enlarged fragmentary view of the device as shown in Figure 8 taken at right angles. This view is shown to illustrate the relative position of the fixed mount 86 with respect to the opening 87 in order to illustrate the relative position of the elastic members 92 within this device.

The elastic members, defined by numerals 24 and 34 in Figures 1 through 5, and numerals 66 and 92 in Figures 6 through 10, shall exhibit such physical properties that when the elastic members are subjected to elongation and shock, the shock absorption shall be directly related to its ability to absorb energy, thus substantially reducing harmonic oscillations. A number of elastomers, of synthetic composition of individual or combined composition, may be used. These elastomers should be capable of being formed into a filament in which the structural elements are oriented in the direction of the axis. These elastomers may be of the following compositions: a long chain synthetic polymeric amide, acrylic polymers, vinylidene polymers, vinyl copolymers, copolymers of butadiene and styrene, copolymers of butadiene and acrylonitrile, copolymers of butadiene and iso-butylene, copolymers of polyvinyl alcohol and butyraldehyde, and combinations thereof.

We have found that the long chain synthetic polymeric amides are of a preferred composition, since the inherent recovery of the material is relatively great. We have found that this material when allowed to relax after it is held under tension does not immediately return to its original length, but creeps back. However, it almost instantly recovers approximately 50% of the stretch imparted and will, during the first 24 hours, recover a total of approximately 85% of the amount stretch. Also, after a longer period of time the material will completely recover and return to its original length. This property is highly desirable because when the elastic member is subjected to the initial stretch, it has the ability to absorb the shock directly which is directly related to the ability to absorb energy.

We have found that the desirable modulous of stretch for the elastic member should have a value of approximately not greater than 0.31 grams per denier per 1% stretch.

The shock absorber or strut 8 may be utilized as a component in aircraft construction wherein the one extremity of the strut 8 is connected to the aircraft frame and the other end to the landing gear or wheel. This novel structure exhibits simplicity in design and has the ability to dissipate large shock loads. The strut 8 may be further adapted to be used in automative vehicles, for shock mountings, suspension shock systems for litter carriers, equipment mountings and the like.

A modified form of the structure may incorporate non-round members in cross-section, such as elliptical, in order to prevent relative rotation of the members, which also eliminates the necessity of accurate machining of the telescopic members. The elimination of the conventional spring or hydraulic system is also a highly desirable feature. The above described structures automatically equalize the variation in shock load irrespective of the relative positions of the coaxial members.

While we have described our invention in detail in conjunction with a preferred embodiment, it will be obvious to those skilled in the art that various changes and modifications may be made therein without departing from the spirit of the invention as defined by the appended claims.

We claim as our invention:

1. A shock absorber comprising a cylinder, a member therein telescopically arranged capable of linear motion for a predetermined distance, a plurality of elastic cords the axes of which are substantially parallel to the longitudinal axes of said telescoping members and interconnecting said cylinder and member, one set of elastic cords interconnecting fixed supports arranged adjacent opposite ends of said cylinder and member in order to exert a force in one linear direction, another set of elastic cords interconnecting fixed supports on said cylinder and said member and exerting a force substantially parallel to the longitudinal axes of said telescoping members in the opposite linear direction, one of said fixed supports being located at an intermediate point on said cylinder.

2. The combination comprising an elongated housing surrounding an inner member arranged to be reciprocable thereto, a plurality of elastic cords within said housing arranged substantially parallel to the longitudinal axis of said housing and interconnecting said housing and said inner member, certain of said cords interconnecting a point on said housing with a spaced point on said inner member to tend to move said inner member out of said housing, the remaining cords interconnecting spaced points on said housing and said inner member to tend to move said inner member into said housing, said cords exercising forces in substantially opposite linear directions and parallel to the longitudinal axis of said housing.

3. A combination comprising an elongated housing surrounding an inner member arranged to be reciprocable thereto, a plurality of elastic cords within said housing positioned substantially parallel to each other and parallel to said housing, said elastic cords interconnecting said housing and said inner member, certain of said cords interconnecting spaced apart supports on said housing and said inner member to tend to move said inner member out of said housing, the remaining cords interconnecting spaced apart supports on said housing and said inner member to tend to move said inner member into said housing, and to position said inner member to permit linear reciprocable motion in either direction from said position.

4. A shock absorber comprising an elongated housing surrounding an inner member arranged to be reciprocable thereto, means for guiding the movement of said inner member, a plurality or elastic cords within said housing the longitudinal axes of which are parallel to the longitudinal axis of said elongated housing and interconnecting said housing and said inner member, a certain group of said cords interconnecting a point on said housing with a spaced point on said inner member to tend to move said inner member out of said housing, the remaining group of cords interconnecting spaced points on said housing and said inner member to tend to move said inner member into said housing, said cords exercising forces in substantially opposite linear directions and parallel to said housing, means at opposite ends of said housing and said inner member for mounting said shock absorber, said first group of cords having one end secured adjacent the free end of said housing, the other group having one end secured adjacent the other end of said housing.

5. A shock absorbing apparatus comprising elongated tubular telescoping members, said members forming a strut, a plurality of elastic cords the longitudinal axes of which are parallel to the longitudinal axes of said telescoping members and interconnecting said members, a certain group of said cords interconnecting a point on one of said members with a spaced point on the other member to tend to move one of said members in a reciprocable manner, the remaining group of cords interconnecting spaced points on one of said members and the other member to tend to compensate the reciprocable motion, said cords exercising forces in opposite linear directions and substantially parallel to said telescoping members.

6. A shock absorber comprising an elongated housing, an inner member arranged to be reciprocably positioned within said housing, means for guiding the movement of said inner member, a first endless elastic cord interconnecting spaced apart points on said housing and said inner member to tend to force said inner member out of said housing, a second endless elastic cord interconnecting spaced apart points on said housing and said inner member to tend to force said inner member into said housing and to position said inner member to permit a loaded reciprocable motion in either direction from said position, the longitudinal axes of said cords being positioned substantially parallel to the longitudinal axis of said elongated housing, and said cords exercising forces in opposite directions.

7. A shock absorber comprising an elongated housing, an inner member arranged to be reciprocably positioned within said housing, means for guiding the movement of said inner member, a first endless elastic cord the axis of which is substantially parallel to the axis of said housing and interconnecting spaced apart points on said housing and said inner member to tend to force normally said inner member out of said housing, a second endless elastic cord the axis of which is positioned substantially parallel to the axis of said housing and interconnecting spaced apart points on said housing and said inner member to tend to move said inner member into said housing in order to compensate for the opposite force applied by said first endless cord.

References Cited in the file of this patent

UNITED STATES PATENTS

| | | |
|---|---|---|
| 812,367 | Rowell | Feb. 13, 1906 |
| 1,177,264 | O'Neill | Mar. 28, 1916 |
| 1,498,044 | Laddon et al. | June 17, 1924 |
| 1,904,220 | Gzupkaytie | Apr. 18, 1933 |
| 1,943,887 | Dowd | Jan. 16, 1934 |
| 2,643,109 | Wood | June 23, 1953 |